US012673571B2

(12) United States Patent
Donnelly et al.

(10) Patent No.: US 12,673,571 B2
(45) Date of Patent: Jul. 7, 2026

(54) COOLING SYSTEM FOR AN ELECTRIC VEHICLE AND A METHOD OF USE

(71) Applicant: BETA AIR, LLC, South Burlington, VT (US)

(72) Inventors: Richard Donnelly, South Burlington, VT (US); Bruce Williams, South Burlington, VT (US); Edward Hall, South Burlington, VT (US)

(73) Assignee: BETA AIR LLC, South Burlington, VT (US)

( * ) Notice: Subject to any disclaimer, the term of this patent is extended or adjusted under 35 U.S.C. 154(b) by 777 days.

(21) Appl. No.: 18/096,967

(22) Filed: Jan. 13, 2023

(65) Prior Publication Data

US 2024/0059168 A1 Feb. 22, 2024

Related U.S. Application Data

(63) Continuation-in-part of application No. 17/890,759, filed on Aug. 18, 2022, now Pat. No. 11,685,277.

(51) Int. Cl.
| | |
|---|---|
| *B60L 53/302* | (2019.01) |
| *B60L 53/16* | (2019.01) |
| *B60L 53/18* | (2019.01) |
| *H02G 11/02* | (2006.01) |

(52) U.S. Cl.
CPC ............. *B60L 53/302* (2019.02); *B60L 53/16* (2019.02); *B60L 53/18* (2019.02); *H02G 11/02* (2013.01)

(58) Field of Classification Search
CPC .................................................... B60L 53/302
USPC ........................................................ 320/109
See application file for complete search history.

(56) References Cited

U.S. PATENT DOCUMENTS

| | | | |
|---|---|---|---|
| 9,975,443 B2 | 5/2018 | Jefferies et al. | |
| 11,014,463 B2 | 5/2021 | Bianco et al. | |
| 11,267,350 B2 | 3/2022 | Bünker et al. | |
| 11,424,630 B1 | 8/2022 | Wiegman | |
| 11,447,030 B1 | 9/2022 | Palombini | |
| 2004/0195066 A1 | 10/2004 | Widegren | |
| 2014/0305759 A1* | 10/2014 | Zuber .................... H02G 11/02 | |
| | | | 191/12.2 R |
| 2016/0001895 A1* | 1/2016 | Tengman ................ B64F 1/305 | |
| | | | 165/248 |

(Continued)

FOREIGN PATENT DOCUMENTS

| | | |
|---|---|---|
| CN | 102316709 A | 1/2012 |
| CN | 203568740 U | 4/2014 |
| WO | 2012069032 | 5/2012 |

OTHER PUBLICATIONS

International Preliminary Report on Patentability for corresponding PCT Application No. PCT/US2023/030566 dated Feb. 27, 2025, 18 pages.

(Continued)

*Primary Examiner* — Jerry D Robbins
(74) *Attorney, Agent, or Firm* — Hoffman Warnick LLC

(57) ABSTRACT

A system of pay-in and pay-out function of a cooling system for an electric vehicle and a method of use is presented in this disclosure. The system may include a cooling cable, a cooling connector, wherein the cooling connector may include an actuator, a cable reel, and an idler drum. The cable reel may include a helical pattern where the cooling cable resides during the stowed configuration. The idler drum may be parallel to the cable reel.

20 Claims, 6 Drawing Sheets

(56)  References Cited

U.S. PATENT DOCUMENTS

| | | | |
|---|---|---|---|
| 2016/0121747 A1* | 5/2016 | Jefferies | B60L 53/16 |
| | | | 320/109 |
| 2019/0341661 A1 | 11/2019 | Guerra et al. | |
| 2020/0171967 A1 | 6/2020 | Gohla-Neudecker et al. | |
| 2020/0338998 A1* | 10/2020 | Wainwright | B60L 58/26 |
| 2021/0061490 A1* | 3/2021 | Heironimus | B60L 1/02 |
| 2021/0238007 A1 | 8/2021 | Wilson et al. | |
| 2021/0284357 A1* | 9/2021 | Villa | B60L 58/16 |
| 2022/0166203 A1* | 5/2022 | Theiß | H02G 11/02 |
| 2022/0194236 A1 | 6/2022 | Whiting et al. | |
| 2022/0250492 A1 | 8/2022 | Jeong | |
| 2022/0258632 A1 | 8/2022 | Ehrenhalt | |

OTHER PUBLICATIONS

International Search Report and Written Opinion for corresponding PCT Application No. PCT/US2023/030566 dated Jan. 12, 2023, 20 pages.

* cited by examiner

COOLING SYSTEM FOR AN ELECTRIC VEHICLE AND A METHOD OF USE

CROSS-REFERENCE TO RELATED APPLICATIONS

This application is a continuation-in-part of Non-provisional application Ser. No. 17/890,759 filed on Aug. 18, 2022 and entitled "AN ELECTRIC VEHICLE CHARGER FOR AN ELECTRIC VEHICLE AND A METHOD OF USE," the entirety of which is incorporated herein by reference.

FIELD OF THE INVENTION

The present invention generally relates to the field of cooling systems. In particular, the present invention is directed to a pay-in and pay-out function of a cooling system for an electric vehicle and a method of use.

BACKGROUND

When providing a cooling system to an electric vehicle, easy to use the cooling system is important. Messy cable solutions may cause frustration and lost time, decreasing the appeal of the electric vehicle. Furthermore, having to manually pay in or out a cooling cable from a cooling system wastes time and creates additional hassle. Additionally, the cooling cable is very heavy and paying out the cable manually is cumbersome. Existing solutions are not satisfactory.

SUMMARY OF THE DISCLOSURE

In an aspect, a system of pay-in and pay-out function of a cooling system for an electric vehicle may include a cooling cable, a cooling connector mechanically connected to the cooling cable, wherein the cooling connector comprising: a rotation mechanism configured to control a pay-in and a pay-out function of a cooling system, a cable reel comprising a helical pattern and configured to stow the cooling cable, and an idler drum parallel to the cable reel.

In another aspect, a method of use for a system of pay-in and pay-out function of a cooling system with a reel toggle for an electric vehicle including activating, by a rotation mechanism of a cooling connector, a pay-in and a pay-out function of a cable reel, paying out, by the cable reel and an idler drum, the cooling cable wherein the cable reel comprises a helical pattern, connecting, by the cooling connector, the cooling cable to the electric vehicle and paying in, by the cable reel and the idler drum, the cooling cable.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems for providing a coolant flow to an electric vehicle. Aspect of the present disclosure may include a reel around which a cooling cable may be wrapped. The cooling cable may be unwound from the reel by a rotation mechanism and an idler drum configured to provide a resultant force.

Aspects of the present disclosure may include a helical pattern where the cooling cable may reside during a stowed configuration.

Aspects of the present disclosure allow for a controller to control rotation mechanism, locking mechanism, and/or opening mechanism. In some embodiments, controller may control these components in response to various actuators that may be operated by the user. This allows for convenient operation of the electric aircraft charging system.

Figure 1:
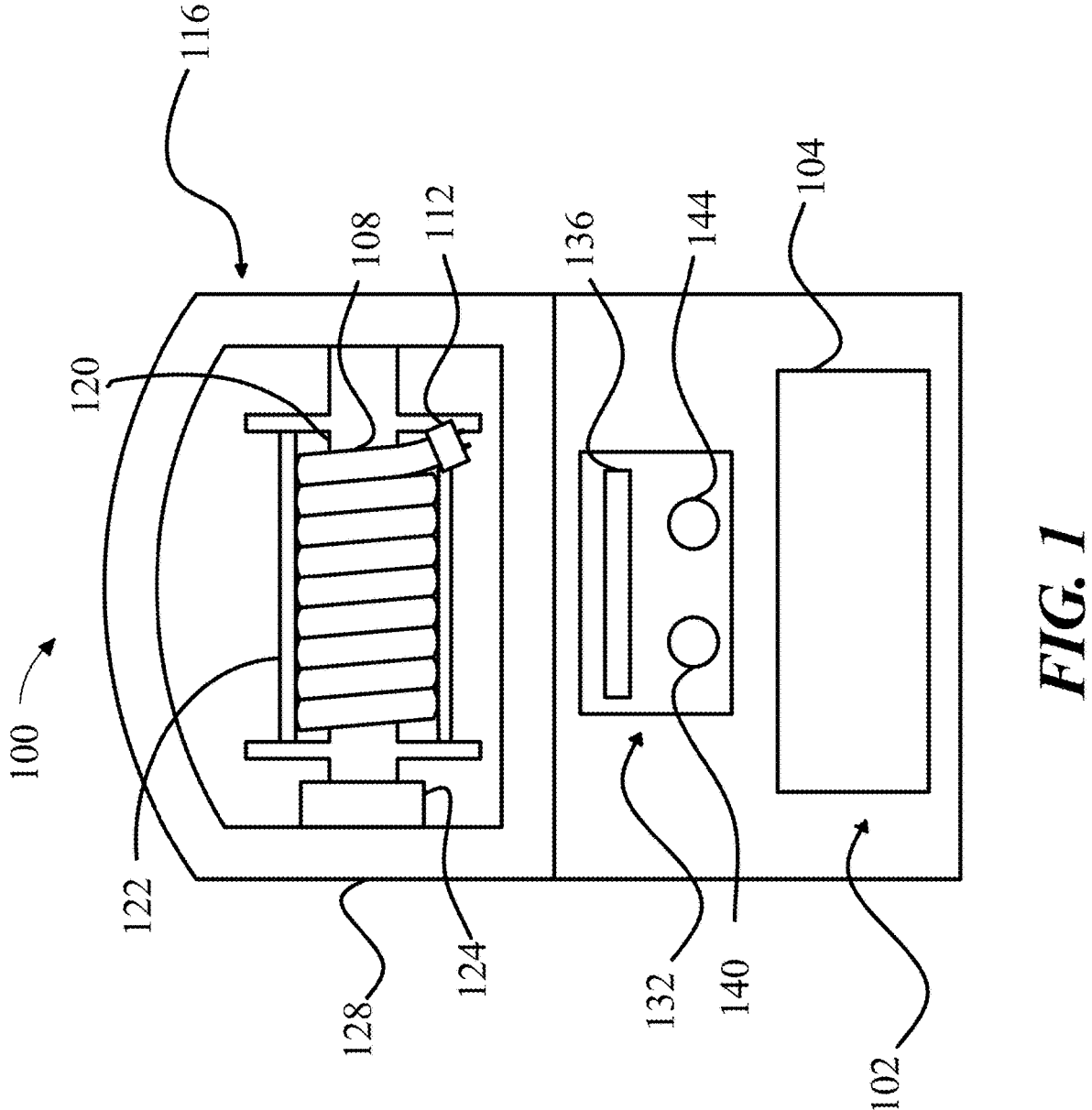
FIG. 1 is a diagram of an exemplary electric aircraft cooling system.

Referring now to FIG. 1, an embodiment of an electric aircraft cooling system 100 is shown. In some embodiments, system 100 may include a cooling base 102. A "cooling base," for the purposes of this disclosure, is a portion of a charging system that is in contact with the ground. In some embodiments, cooling base 102 may be fixed to another structure. As a non-limiting example, cooling base 102 may be fixed to a helipad. As another non-limiting example, cooling base 102 may be fixed to the ground. As another non-limiting example, cooling base 102 may be fixed to a cart, wherein the cart may have wheels. One of ordinary skill in the art would appreciate, after having reviewed the entirety of this disclosure, that cooling base 102 may fixed to a variety of structures or objects depending on the location and/or support requirements of system 100. Cooling base 102 may be located on or proximal to a helideck or on or near the ground. In this disclosure, a "helideck" is a purpose-built helicopter landing area located near cooling base 102 and may be in electric communication with it. Helideck may be elevated or at ground level. Helideck may be made from any suitable material and may be any dimension. Helideck may include a designated area for the electric vehicle to land and takeoff on. Alternatively, cooling base 102 may be located on a vehicle, such as a cart or a truck, thereby allowing cooling base 102 to be mobile and moved to an electric vehicle.

With continued reference to FIG. 1, in some embodiments, cooling base 102 may include a coolant source 104. As used in this disclosure, a "coolant source" is an origin, generator, reservoir, or flow producer of coolant. In some cases, coolant source 104 may include a flow producer, such as a fan and/or a pump. Coolant source 104 may include any of the following non-limiting examples, air conditioner, refrigerator, heat exchanger, pump, fan, expansion valve, and the like. As used in this disclosure, a "pump" is a mechanical source of power that converts mechanical power into fluidic energy. A pump may generate flow with enough power to overcome pressure induced by a load at a pump outlet. A pump may generate a vacuum at a pump inlet, thereby forcing fluid from a reservoir into the pump inlet to the pump and by mechanical action delivering this fluid to a pump outlet. The pump may include a substantially constant pressure pump (e.g., centrifugal pump) or a substantially constant flow pump (e.g., positive displacement pump, gear pump, and the like). In some embodiments, the pump may be hydrostatic or hydrodynamic. Hydrostatic pumps are positive displacement pumps. Hydrodynamic pumps can be fixed displacement pumps, in which displacement may not be adjusted, or variable displacement pumps, in which the displacement may be adjusted. Exemplary non-limiting pumps include gear pumps, rotary vane pumps, screw pumps, bent axis pumps, inline axial piston pumps, radial piston pumps, and the like. Pump may be powered by any rotational mechanical work source, for example without limitation and electric motor or a power take off from an engine. Pump may be in fluidic communication with at least a reservoir. In some cases, reservoir may be unpressurized and/or vented. Alternatively, reservoir may be pressurized and/or sealed.

With continued reference to FIG. 1, as used in this disclosure, "coolant" is any flowable heat transfer medium. Coolant may include a liquid, a gas, a solid, and/or a fluid. Coolant may include a compressible fluid and/or a non-compressible fluid. Coolant may include a non-electrically conductive liquid such as a fluorocarbon-based fluid, such as without limitation Fluorinert™ from 3M of Saint Paul, Minnesota, USA. In some cases, coolant may include air. Alternatively or additionally, in some cases, coolant may include a solid (e.g., bulk material) and coolant flow may include motion of the solid. Exemplary forms of mechanical motion for bulk materials include fluidized flow, augers, conveyors, slumping, sliding, rolling, and the like. Additionally and without limitation, additional disclosure related to coolant may be found in U.S. patent application Ser. No. 17/405,840 entitled "CONNECTOR AND METHODS OF USE FOR CHARGING AN ELECTRIC VEHICLE," which is incorporated in its entirety herein by reference.

With continued reference to FIG. 1, in some embodiments, a coolant may be configured to transfer heat between coolant, for example coolant belonging to coolant flow, and an ambient air. As used in this disclosure, "ambient air" is air which is proximal a system and/or subsystem, for instance the air in an environment which a system and/or sub-system is operating. For example, in some cases, coolant source 104 may include a heat transfer device between coolant and ambient air. Exemplary heat transfer devices include, without limitation, chillers, Peltier junctions, heat pumps, refrigeration, air conditioning, expansion or throttle valves, heat exchangers (air-to-air heat exchangers, air-to-liquid heat exchangers, shell-tube heat exchangers, and the like), vapor-compression cycle system, vapor absorption cycle system, gas cycle system, Stirling engine, reverse Carnot cycle system, and the like.

With continued reference to FIG. 1, in some embodiments, coolant source 104 may provide a coolant flow to an electric vehicle. As used in this disclosure, a "flow of coolant" is a stream of coolant. In some embodiments, coolant flow may substantially be comprised of air. In some cases, coolant flow may have a rate within a range a specified range. A non-limiting exemplary coolant flow range may be about 0.1 CFM and about 100 CFM. In some cases, rate of coolant flow may be considered as a volumetric flow rate. Alternatively or additionally, rate of coolant flow may be considered as a velocity or flux. In some embodiments, coolant source 104 may be further configured to transfer heat between a heat source, such as without limitation ambient air or chemical energy, such as by way of combustion, and coolant, for example coolant flow. In some cases, coolant source 104 may heat coolant, for example above ambient air temperature, and/or cool coolant, for example below an ambient air temperature. As used in this disclosure, an "ambient air temperature" is temperature of an ambient air. An exemplary non-limiting temperature range below ambient air temperature is about −5° C. to about −30° C. In some cases, coolant source 104 may be powered by electricity, such as by way of one or more electric motors. Alternatively or additionally, coolant source 104 may be powered by a combustion engine, for example a gasoline powered internal combustion engine. In some cases, coolant flow may be configured, such that heat transfer is facilitated between coolant flow and at least a battery, by any methods known and/or described in this disclosure. In some cases, at least a battery may include a plurality of pouch cells. In some cases, heat is transferred between coolant flow and one or more components of at least a pouch cell, including without limitation electrical tabs, pouch and the like. In some cases, coolant flow may be configured to facilitate hear transfer between the coolant flow and at least a conductor of electric vehicle, including without limitation electrical busses within at least a battery. Additionally and without limitation, coolant source 104 may be consistent with a coolant source found in U.S. patent application Ser. No. 17/405,840 entitled "CONNECTOR AND METHODS OF USE FOR CHARGING AN ELECTRIC VEHICLE," or U.S. patent application Ser. No. 17/515,60, filed on Nov. 1, 2021, and entitled "ELECTRIC VEHICLE PORT AND METHODS OF USE FOR CHARGING AN ELECTRIC VEHICLE," both of which are incorporated in their entirety herein by reference.

With continued reference to FIG. 1, system 100 may include a cooling cable 108. A "cooling cable," for the purposes of this disclosure, is a cable or a tube adapted to carry coolant for the purpose of providing a coolant flow to an electric vehicle. Cooling cable 108 is configured to carry coolant. In an embodiment, cooling cable 108 is fluidly connected to coolant source 104. "Fluidly connected," also called "fluidic communication," as used in this disclosure, is an attribute wherein two or more relata interact with one another by way of a fluidic flow or fluid in general. As a non-limiting example, cooling cable 108 is fluidly connected to coolant source 104 by way of a coolant flow or a coolant. In another embodiment, cooling cable 108 is mechanically coupled to coolant source 104. As used herein, a person of ordinary skill in the art would understand "mechanically coupled" to mean that at least a portion of a device, component, or circuit is connected to at least a portion of the aircraft via a mechanical coupling. Said mechanical coupling can include, for example, rigid coupling, such as beam coupling, bellows coupling, bushed pin coupling, constant velocity, split-muff coupling, diaphragm coupling, disc coupling, donut coupling, elastic coupling, flexible coupling, fluid coupling, gear coupling, grid coupling, Hirth joints, hydrodynamic coupling, jaw coupling, magnetic coupling, Oldham coupling, sleeve coupling, tapered shaft lock, twin spring coupling, rag joint coupling, universal joints, or any combination thereof. As a non-limiting example, aircraft may include airplanes, helicopters, airships, blimps, gliders, paramotors, and the like thereof. In an embodiment, mechanical coupling may be used to connect the ends of adjacent parts and/or objects of an electric aircraft. Further, in an embodiment, mechanical coupling may be used to join two pieces of rotating electric aircraft components. Cooling cable 108 may be a variety of lengths depending on the length required by the specific implementation. As a non-limiting example, cooling cable 108 may be 10 feet. As another non-limiting example, cooling cable 108 may be 25 feet. As yet another non-limiting example, cooling cable 108 may be 50 feet.

With continued reference to FIG. 1, system 100 may include a cooling connector 112. A "cooling connector," as used in this disclosure, is a connector that connects two devices and provides cooling flow. Cooling cable 108 may be mechanically connected to cooling connector 112. Cooling connector 112 may be disposed at one end of cooling cable 108. Cooling connector 112 may be configured to couple with a corresponding cooling port on an electric vehicle. For the purposes of this disclosure, a "cooling connector" is a device adapted to connect a device to provide fluidic communication. For the purposes of this disclosure, a "cooling port" is a section on a device to be charged, arranged to receive a cooling connector. "Fluidic communication," as used in this disclosure, is an attribute wherein two or more relata interact with one another by way of a fluidic flow or fluid in general. As a non-limiting example, fluidic communication may be generated between a coolant source 104 and an electric aircraft. With continued reference to FIG. 1, in some embodiments, an "electrical vehicle," as used in this disclosure, a vehicle that is electrically powered. The electric vehicle may use one or more electric motors for propulsion. As a non-limiting example, the electric vehicle may include road and rail vehicles, surface and underwater vessels, electric aircraft and electric spacecraft. An "electric aircraft," as used in this disclosure, is an electrically powered aircraft. Electric aircraft may be capable of rotor-based cruising flight, rotor-based takeoff, rotor-based landing, fixed-wing cruising flight, airplane-style takeoff, airplane-style landing, and/or any combination thereof. "Rotor-based flight," as described in this disclosure, is where the aircraft generated lift and propulsion by way of one or more powered rotors coupled with an engine, such as a quadcopter, multi-rotor helicopter, or other vehicle that maintains its lift primarily using downward thrusting propulsors. "Fixed-wing flight," as described in this disclosure, is where the aircraft is capable of flight using wings and/or foils that generate lift caused by the aircraft's forward airspeed and the shape of the wings and/or foils, such as airplane-style flight. In some embodiments, electric aircraft 104 may include electric vertical takeoff and landing (eVTOL) aircraft. A "vertical take-off and landing (eVTOL) aircraft," as used in this disclosure, is one that can hover, take off, and land vertically. Additionally without limitation, the electric aircraft may be consistent with an aircraft found in U.S. patent application Ser. No. 17/405,840 entitled "CONNECTOR AND METHODS OF USE FOR CHARGING AN ELECTRIC VEHICLE," which is incorporated in its entirety herein by reference.

With continued reference to FIG. 1, in some cases, cooling connector 112 may be configured to mate with a port of an electric vehicle. "Mate," as used in this disclosure, is an action of attaching two or more components together. Mating may be performed using a mechanical or electromechanical means described in this disclosure. For example, without limitation mating may include an electromechanical device used to join electrical conductors and create an electrical circuit. In some cases, mating may be performed by way of gendered mating components. A gendered mate may include a male component or plug which is inserted within a female component or socket. In some cases, mating may be removable. In some cases, mating may be permanent. In some cases, mating may be removable, but require a specialized tool or key for removal. Mating may be achieved by way of one or more of plug and socket mates, pogo pin contact, crown spring mates, and the like. In some cases, mating may be keyed to ensure proper alignment of connecting line. In some cases, mate may be lockable. A "port," as used in this disclosure, is an interface, for example of an interface configured to receive another component or an interface configured to transmit and/or receive signal on a computing device. As a non-limiting example, a port may include a cooling port that may be configured to mate with a cooling connector 112 and transmit a coolant flow. As another non-limiting example, a port may include a cooling port that may be configured to mate with a cooling connector and transmit power. As another non-limiting example, a port may include a data port. A "data port," as used in this disclosure, is a port that is used for data communication. As used in this disclosure, "communication" is an attribute wherein two or more relata interact with one another, for example within a specific domain or in a certain manner.

With continued reference to FIG. 1, in some embodiments, cooling connector 112 may include a fastener. In some embodiments, cooling connector 112 may be configured to mate with a port of an electric vehicle by way of one or more press fasteners. As used in this disclosure, a "fastener" is a physical component that is designed and/or configured to attach or fasten two (or more) components together. Cooling connector 112 may include one or more attachment components or mechanisms, for example without limitation fasteners, threads, snaps, canted coil springs, and the like. As used in this disclosure, a "press fastener" is a fastener that couples a first surface to a second surface when the two surfaces are pressed together. Some press fasteners include elements on the first surface that interlock with elements on the second surface; such fasteners include without limitation hook-and-loop fasteners such as VELCRO fasteners produced by Velcro Industries B.V. Limited Liability Company of Curacao Netherlands, and fasteners held together by a plurality of flanged or "mushroom"-shaped elements, such as 3M DUAL LOCK fasteners manufactured by 3M Company of Saint Paul, Minnesota. Press-fastener may also include adhesives, including reusable gel adhesives, GECKSKIN adhesives developed by the University of Massachusetts in Amherst, of Amherst, Massachusetts, or other reusable adhesives. Where press-fastener includes an adhesive, the adhesive may be entirely located on the first surface of the press-fastener or on the second surface of the press-fastener, allowing any surface that can adhere to the adhesive to serve as the corresponding surface. In some cases, connector 112 may be connected to port 108 by way of magnetic force. For example, connector 112 may include one or more of a magnetic, a ferro-magnetic material, and/or an electromagnet. Fastener may be configured to provide removable attachment between connector 112 and port. As used in this disclosure, "removable attachment" is an attributive term that refers to an attribute of one or more relata to be attached to and subsequently detached from another relata; removable attachment is a relation that is contrary to permanent attachment wherein two or more relata may be attached without any means for future detachment. Exemplary non-limiting methods of permanent attachment include certain uses of adhesives, glues, nails, engineering interference (i.e., press) fits, and the like. In some cases, detachment of two or more relata permanently attached may result in breakage of one or more of the two or more relata.

With continued reference to FIG. 1, in some embodiments, cooling connector 112 may include a proximity sensor. As used in this disclosure, a "proximity sensor" is a sensor that is configured to detect at least a phenomenon related to a device, such as but not limited to cooling connector 112 being mated to another device, such as but not limited to a port of an electric vehicle. The proximity sensor may include any sensor described in this disclosure, including without limitation a switch, a capacitive sensor, a capacitive displacement sensor, a doppler effect sensor, an inductive sensor, a magnetic sensor, an optical sensor (such as without limitation a photoelectric sensor, a photocell, a laser rangefinder, a passive charge-coupled device, a passive thermal infrared sensor, and the like), a radar sensor, a reflection sensor, a sonar sensor, an ultrasonic sensor, fiber optics sensor, a Hall effect sensor, and the like. In some embodiments, the proximity sensor may be electrically communicative with a proximity signal conductor. In some embodiments, cooling cable 108 may include a proximity signal conductor. As used in this disclosure, an "proximity signal conductor" is a conductor configured to carry a proximity signal. As used in this disclosure, a "proximity signal" is a signal that is indicative of information about a location of connector. As a non-limiting example, the proximity signal may be indicative of attachment of a cooling connector 112 with a cooling port of an electric aircraft. As another non-limiting example, the proximity signal may be indicative of attachment of a charging connector with a charging port of an electric car. In some cases, a proximity signal may include an analog signal, a digital signal, an electrical signal, an optical signal, a fluidic signal, or the like.

With continued reference to FIG. 1, in some embodiments, system 100 may include a cable reel module 116. The cable reel module 116 may include a cable reel 120 (also referred to as "reel"). For the purposes of this disclosure, "a cable reel module" is the portion of a cooling system containing a reel, that houses a cooling cable when the cooling cable is stowed. For the purposes of this disclosure, a "reel" is a rotary device around which an object may be wrapped. Reel 120 is rotatably mounted to cable reel module 116. For the purposes of this disclosure, "rotatably mounted" means mounted such that the mounted object may rotate with respect to the object that the mounted object is mounted on. Reel 120 may be cylindrical shaped. In an embodiment, reel 120 may be positioned horizontally, as shown without limitation in FIG. 1 and FIGS. 3A and B. In another embodiment, reel 120 may be positioned vertically. In some embodiments, reel 120 may be positioned diagonally. Additionally, when the cooling cable 108 is in a stowed configuration, the cooling cable is wound around reel 120. As a non-limiting example, cooling cable 108 may be in the stowed configuration as shown without limitation in FIG. 1. In the stowed configuration, cooling cable 108 need not be completely wound around reel 120. As a non-limiting example, a portion of cooling cable 108 may hang free from reel 120 even when cooling cable 108 is in the stowed configuration. In the stowed configuration, cooling cable 108 may be coiled in a single layer around reel 120. Reel 120 may include a helical pattern for cooling cable 108 to coil around. Helical pattern may be presented as groves and ridges on a surface of reel 120. Helical pattern may be described in further detail with respect to FIG. 3.

Continued reference to FIG. 1, in some embodiments, cable reel module 116 may include an idler drum 122. An "idler drum", as used herein, is a freely rotating part. Idler drum 122 may be hollow or filled. In some embodiments, an idler drum 122 may be parallel to cable reel 120. In an embodiment, idler drum 122 may be placed above or below cable reel 120 such that the stowed cooling cable 108 is in between the cable reel 120 and the idler drum 122. In some embodiments, system 100 may include one or more idler drums. For example, there may be one idler drum above cable reel 120 and one idler drum below cable reel 120. Idler drum 122 may apply a pressure to cooling cable 108 to hold cooling cable 108 to the helical groves on reel 120. Idler drum 122 may provide a resultant force during a payout of cooling cable 108. This is due to the idler drum 122 being free spinning. For the purposes of this disclosure, "free spinning" means able to rotate with little to no resistance. "Pay out", as used herein, is the act of extending or drawing out. For example, paying out cooling cable 108 means releasing cooling cable 108 from cable reel 120 to bring it closer to a vehicle/device to be mated. In some embodiments, when paying out cooling cable 108, cable reel 120 may be rotating in a reverse direction, discussed further below. In an embodiment where a reverse direction is counterclockwise, idler drum 122 may be rotating clockwise, or vice versa. The motion of the cable reel 120 moving counterclockwise may cause an opposite rotation on the idler drum 122. The opposing rotations may allow cooling cable 108 to be pushed from cable reel 120. Without idler drum 122, the rotation of cable reel 120 alone may not push cooling cable 120 out of cable reel 120 without assistance from a person, robot, or the like that may provide a pulling force, pulling cooling cable 108 from cable reel 120. The addition of an idler drum 122 allows for ease of cooling, as cooling cable 108 may be heavy and cumbersome to manually pull.

With continued reference to FIG. 1, in some embodiments, cable reel module 116 may include a rotation mechanism 124. A "rotation mechanism," for the purposes of this disclosure is a mechanism that is configured to cause another object to undergo rotary motion. As a non-limiting example, rotation mechanism may include a rotary actuator. An actuator may include a component of a machine that is responsible for moving and/or controlling a mechanism or system. An actuator may, in some cases, require a control signal and/or a source of energy or power. In some cases, a control signal may be relatively low energy. Exemplary control signal forms include electric potential or current, pneumatic pressure or flow, or hydraulic fluid pressure or flow, mechanical force/torque or velocity, or even human power. In some cases, an actuator may have an energy or power source other than control signal. This may include a main energy source, which may include for example electric power, hydraulic power, pneumatic power, mechanical power, and the like. In some cases, upon receiving a control signal, an actuator responds by converting source power into mechanical motion. In some cases, an actuator may be understood as a form of automation or automatic control. As a non-limiting example, rotation mechanism 124 may include an electric motor. As another non-limiting example, rotation mechanism 124 may include a servomotor. As yet another non-limiting example, rotation mechanism 124 may include a stepper motor. In some embodiments, rotation mechanism 124 may include a compliant element. For the purposes of this disclosure, a "compliant element" is an element that creates force through elastic deformation. As a non-limiting example, rotation mechanism 124 may include a torsional spring, wherein the torsional spring may elastically deform when reel 120 is rotated in, for example, the forward direction; this would cause the torsional spring to exert torque on reel 120, causing reel 120 to rotate in a reverse direction when it has been released. Rotation mechanism 124 is configured to rotate reel 120 in a reverse direction. In some embodiments, rotation mechanism 124 may be configured to rotate reel 120 in a forward direction. Forward direction and reverse direction are opposite directions of rotation. As a non-limiting example, the forward direction may be clockwise, whereas the reverse direction may be counterclockwise, or vice versa. As a non-limiting example, rotating in the forward direction may cause cooling cable 108 to extend, whereas rotating in the reverse direction may cause cooling cable 108 to stow, or vice versa. In some embodiments, rotation mechanism 124 may continually rotate reel 120 when rotation mechanism 124 is enabled. In some embodiments, rotation mechanism 124 may be configured to rotate reel 120 by a specific number of degrees. In some embodiments, rotation mechanism 124 may be configured to output a specific torque to reel 120. As a non-limiting example, this may be the case, wherein rotation mechanism 124 is a torque motor. Rotation mechanism 124 may be electrically connected to coolant source 104.

With continued reference to FIG. 1, in some embodiments, cable reel module 116 may include an outer case 128. Outer case 128 may enclose reel 120, idler drum 122, and rotation mechanism 124. In some embodiments, outer case 128 may enclose cooling cable 108 and possibly cooling connector 112 when the cooling cable 108 is in its stowed configuration.

With continued reference to FIG. 1, in some embodiments, system 100 may include a control panel 132. For the purposes of this disclosure, a "control panel" is a panel containing a set of controls for a device. Control panel 132 may include a display 136, a reel toggle 140, and a reel locking toggle 144. For the purposes of this disclosure, a "display" is an electronic device for the visual presentation of information. Display 136 may be any type of screen. As non-limiting examples, display 136 may be an LED screen, an LCD screen, an OLED screen, a CRT screen, a DLPT screen, a plasma screen, a cold cathode display, a heated cathode display, a nixie tube display, and the like. Display 136 may be configured to display any relevant information. A person of ordinary skill in the art would appreciate, after having reviewed the entirety of this disclosure, that a variety of information could be displayed on display 136. In some embodiments, display 136 may display metrics associated with the suppling a cooling system to an electric vehicle. As a non-limiting example, this may include amount of coolant transferred. As another non-limiting example, this may include coolant transferring time remaining. "Coolant transferring time," as used in this disclosure, is the time it takes to transfer coolant from one device to another device, for example without limitation from coolant source 104 to an electric aircraft. As another non-limiting example, this may include coolant transferring time elapsed.

With continued reference to FIG. 1, in some embodiments, reel toggle 140 may be configured to send a first toggle signal to a controller, such as without limitation controller 204 in FIG. 1, wherein the first toggle signal may cause the controller to send a retraction signal. A "toggle" for the purposes of this disclosure, is a device or signal, configured to change a mechanism or device between at least two states. A "reel toggle," for the purposes of this disclosure, is a toggle that changes or alters, directly or indirectly, the rotation of a reel. Reel toggle 140, the controller, and the retraction signal are further discussed with reference to FIG. 2. In some embodiments, reel toggle 140 may be a button, wherein pressing the button causes reel toggle 140 to send the first toggle signal. In some embodiments, reel toggle 140 may be configured to send a second toggle signal to the controller, wherein the second signal causes the controller to send an extension signal. Second toggle signal and extension signal are discussed further with reference to FIG. 2. In some embodiments, reel toggle may be disposed on outer case 128 of cable reel module 116. In some embodiments, reel toggle may be disposed on cooling connector 112.

With continued reference to FIG. 1, in some embodiments, reel locking toggle 144 may be configured to send a reel locking toggle signal to a controller, wherein receiving the reel locking toggle signal may cause the controller to send an unlocking signal to a locking mechanism. A "reel locking toggle," for the purposes of this disclosure, is a toggle that changes or alters, directly or indirectly, the state of a locking mechanism. A "reel locking toggle signal," for the purposes of this disclosure, is a signal send by a reel locking toggle, wherein the reel locking toggle signal causes, directly or indirectly, a change or altercation of a locking mechanism. Receiving the unlocking signal may cause the locking mechanism to enter its disengaged state. Reel locking toggle 144, reel locking toggle signal, controller, and unlocking signal are discussed further with reference to FIG. 1. The locking mechanism is discussed further with reference to FIG. 3. In some embodiments, reel locking toggle may be disposed on outer case 128 of cable reel module 116. In some embodiments, reel locking toggle may be disposed on cooling connector 112.

With continued reference to FIG. 1, in some embodiments, a variety of devices may be used for reel toggle 140 and/or reel locking toggle 144. Reel toggle 140 and/or reel locking toggle 144 may be a button or the like mounted to a surface of cooling connector 112. As non-limiting examples, the button may be a mechanical button, a resistive button, a capacitive button, and the like. As a another nonlimiting example, the button may be a virtual button on a touchscreen. In some embodiments, reel toggle 140 and/or reel locking toggle 144 may each include a dial. The dial may include any number of positions, or it may be a continuous dial. In some embodiments, the dial may have 2 positions, wherein one position may be disengaged, and the second position may be engaged, and thus cause a toggle signal to be sent to the controller. In some embodiments, the dial may include an additional third position, wherein the second position causes the first toggle signal to be sent and the second position causes the second toggle signal to be sent. As another non-limiting example, reel toggle 140 and/or reel locking toggle 144 may each include a lever. In an embodiment, reel 120 may pay out a cable, such as without limitation cooling cable 108 as the lever is pushed down. In another embodiment, reel 120 may pay in a cable, such as without limitation cooling cable 108, as the lever is pulled up. In some embodiments, reel 120 may pay in a cable as the lever is pushed down and pay out the cable as the lever is pushed up. In an embodiment, the lever may be installed on the side of outer case 128. In another embodiment, the lever may be installed next to outer case 128. In some embodiments, the lever may be installed on the top of outer case 128. As another non-limiting example, reel toggle 140 and/or reel locking toggle 144 may each include a rocker switch. In some embodiments, the rocker switch may have 2 positions, wherein one position may be disengaged, and the second position may be engaged, and thus cause a toggle signal to be sent to the controller. In some embodiments, the rocker switch may include an additional third position, wherein the second position causes the first toggle signal to be sent and the second position causes the second toggle signal to be sent. One of ordinary skill in the art would appreciate, after having reviewed the entirety of this disclosure, that a variety of possible devices may be suitable for use as reel toggle 140 and/or reel locking toggle 144.

With continued reference to FIG. 1, in some embodiments, cooling connector 112 may be incorporated with a charging connector. A "charging connector," as used in this disclosure, is a connector that connects two devices and transfers electrical power. As used in this disclosure, a "connector" is a distal end of a tether or a bundle of tethers, e.g., hose, tubing, cables, wires, and the like, which is configured to removably attach with a mating component, for example without limitation a port. In some embodiments, the charging connector may supply electrical power from energy source. An "energy source," for the purposes of this disclosure, is a source of electrical power. In some embodiments, energy source may be an energy storage device, such as, for example, a battery or a plurality of batteries. A battery may include, without limitation, a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. Additionally, energy source need not be made up of only a single electrochemical cell, it can consist of several electrochemical cells wired in series or in parallel. In other embodiments, energy source may be a connection to the power grid. For example, in some non-limiting embodiments, energy source may include a connection to a grid power component. Grid power component may be connected to an external electrical power grid. In some other embodiments, the external power grid may be used to charge batteries, for example, when energy source includes batteries. In some embodiments, grid power component may be configured to slowly charge one or more batteries in order to reduce strain on nearby electrical power grids. In one embodiment, grid power component may have an AC grid current of at least 450 amps. In some embodiments, grid power component may have an AC grid current of more or less than 450 amps. In one embodiment, grid power component may have an AC voltage connection of 480 Vac. In other embodiments, grid power component may have an AC voltage connection of above or below 480 Vac. Without limitation the charging connector may be consistent with a charger disclosed in U.S. application Ser. No. 17/477,987 filed on Sep. 17, 2021, titled "Systems and Methods for Adaptive Electric aircraft," the entirety of which is hereby incorporated by reference. Additionally, and without limitation, the connecting connector may be consistent with a charger disclosed in U.S. application Ser. No. 17/515,448 filed on Oct. 31, 2021, titled "Systems and Methods for an Immediate Shutdown of an Electric aircraft Charger," the entirety of which is hereby incorporated by reference.

With continued reference to FIG. 1, charging connector may include a variety of pins adapted to mate with a charging port disposed on an electric aircraft. The variety of pins included on charging connector may include, as non-limiting examples, a set of pins chosen from an alternating current (AC) pin, a direct current (DC) pin, a ground pin, a communication pin, a sensor pin, a proximity pin, and the like. In some embodiments, charging connector may include more than one of one of the types of pins mentioned above.

With continued reference to FIG. 1, for the purposes of this disclosure, a "pin" may be any type of electrical connector. An electrical connector is a device used to join electrical conductors to create a circuit. As a non-limiting example, in some embodiments, any pin of charging connector may be the male component of a pin and socket connector. In other embodiments, any pin of charging connector may be the female component of a pin and socket connector. As a further example of an embodiment, a pin may have a keying component. A keying component is a part of an electrical connector that prevents the electrical connector components from mating in an incorrect orientation. As a non-limiting example, this can be accomplished by making the male and female components of an electrical connector asymmetrical. Additionally, in some embodiments, a pin, or multiple pins, of charging connector may include a locking mechanism. For instance, as a non-limiting example, any pin of charging connector may include a locking mechanism to lock the pins in place. The pin or pins of charging connector may each be any type of the various types of electrical connectors disclosed above, or they could all be the same type of electrical connector. One of ordinary skills in the art, after reviewing the entirety of this disclosure, would understand that a wide variety of electrical connectors may be suitable for this application.

With continued reference to FIG. 1, in some embodiments, charging connector may include a DC pin. DC pin supplies DC power. "DC power," for the purposes of this disclosure refers to a one-directional flow of charge. For example, in some embodiments, DC pin may supply power with a constant current and voltage. As another example, in other embodiments, DC pin may supply power with varying current and voltage, or varying currant constant voltage, or constant currant varying voltage. In another embodiment, when charging connector is charging certain types of batteries, DC pin may support a varied charge pattern. This involves varying the voltage or currant supplied during the charging process in order to reduce or minimize battery degradation. Examples of DC power flow include half-wave rectified voltage, full wave rectified voltage, voltage supplied from a battery or other DC switching power source, a DC converter such as a buck or boost converter, voltage supplied from a DC dynamo or other generator, voltage from photovoltaic panels, voltage output by fuel cells, or the like.

With continued reference to FIG. 1, in some embodiments, charging connector may include an AC pin. An AC pin supplies AC power. For the purposes of this disclosure, "AC power" refers to electrical power provided with a bi-directional flow of charge, where the flow of charge is periodically reversed. AC pin may supply AC power at a variety of frequencies. For example, in a non-limiting embodiment, AC pin may supply AC power with a frequency of 50 Hz. In another non-limiting embodiment, AC pin may supply AC power with a frequency of 60 Hz. One of ordinary skills in the art, upon reviewing the entirety of this disclosure, would realize that AC pin may supply a wide variety of frequencies. AC power produces a waveform when it is plotted out on a current vs. time or voltage vs. time graph. In some embodiments, the waveform of the AC power supplied by AC pin may be a sine wave. In other embodiments, the waveform of the AC power supplied by AC pin may be a square wave. In some embodiments, the waveform of the AC power supplied by AC pin may be a triangle wave. In yet other embodiments, the waveform of the AC power supplied by AC pin may be a sawtooth wave. The AC power supplied by AC pin may, in general, have any waveform, so long as the wave form produces a bi-directional flow of charge. AC power may be provided without limitation, from alternating current generators, "mains" power provided over an AC power network from power plants, AC power output by AC voltage converters including transformer-based converters, and/or AC power output by inverters that convert DC power, as described above, into AC power. For the purposes of this disclosure, "supply," "supplies," "supplying," and the like, include both currently supplying and capable of supplying. For example, a live pin that "supplies" DC power need not be currently supplying DC power, it can also be capable of supplying DC power.

With continued reference to FIG. 1, in some embodiments, charging connector may include a ground pin. A ground pin is an electronic connector that is connected to the ground. For the purpose of this disclosure, "ground" is the reference point from which all voltages for a circuit are measured. "Ground" can include both a connection to the earth, or a chassis ground, where all of the metallic parts in a device are electrically connected together. In some embodiments, "ground" can be a floating ground. Ground may alternatively or additionally refer to a "common" channel or "return" channel in some electronic systems. For instance, a chassis ground may be a floating ground when the potential is not equal to earth ground. In some embodiments, a negative pole in a DC circuit may be grounded. A "grounded connection," for the purposes of this disclosure, is an electrical connection to "ground." A circuit may be grounded in order to increase safety in the event that a fault develops, to absorb and reduce static charge, and the like. Speaking generally, a grounded connection allows electricity to pass through the grounded connection to ground instead of through, for example, a human that has come into contact with the circuit. Additionally, grounding a circuit helps to stabilize voltages within the circuit.

With continued reference to FIG. 1, in some embodiments, charging connector may include a communication pin. A communication pin is an electric connector configured to carry electric signals between components of a charging system or cooling system 100 and components of an electric aircraft. As a non-limiting example, communication pin may carry signals from a controller in a charging system (e.g. controller 204 disclosed with reference to FIG. 2) to a controller onboard an electric aircraft such as a flight controller or battery management controller. A person of ordinary skill in the art would recognize, after having reviewed the entirety of this disclosure, that communication pin could be used to carry a variety of signals between components. In some embodiments, cooling system 100 may be consistent with cooling module, as disclosed in U.S. Nonprovisional patent application Ser. No. 17/752,248, filed on May 24, 2022, and titled "GROUND SERVICE SYSTEMS AND DEVICES FOR AN ELECTRIC AIRCRAFT," the entirety of which is incorporated by reference herein.

With continued reference to FIG. 1, in some embodiments, charging connector may include a variety of additional pins. As a non-limiting example, charging connector may include a proximity detection pin. Proximity detection pin has no current flowing through it when charging connector is not connected to a port. Once the charging connector is connected to a port, then proximity detection pin will have current flowing through it, allowing for the controller to detect, using this current flow, that the charging connector is connected to a port.

With continued reference to FIG. 1, additional disclosures on charging with a cable reel may be found in U.S. patent application Ser. No. 17/736,530 filed on May 4, 2022, and entitled "SYSTEM FOR AN ELECTRIC AIRCRAFT CHARGING WITH A CABLE REEL", which is incorporated in its entirety herein.

Figure 2:
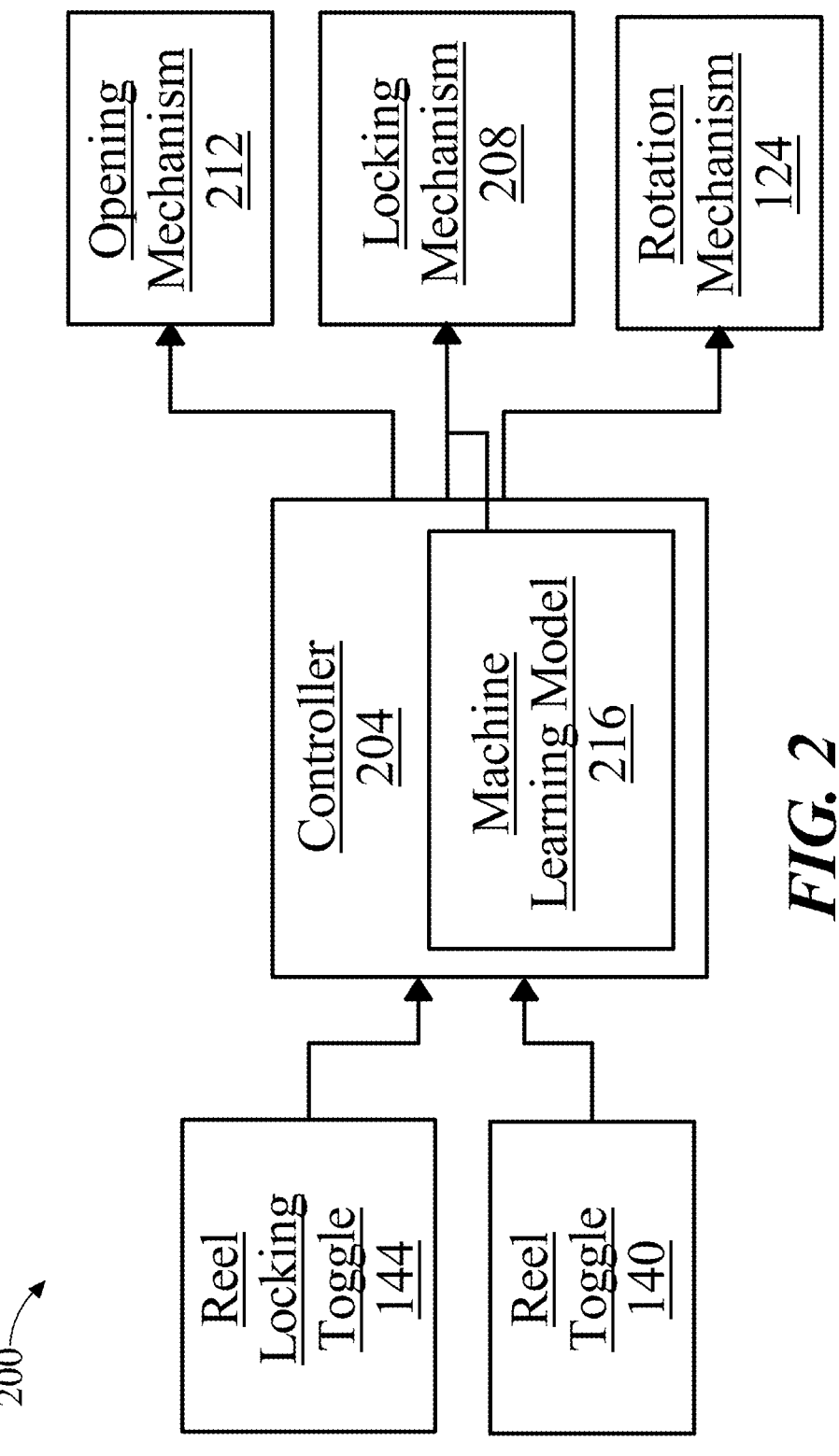
FIG. 2 is a block diagram of an exemplary control system for an electric aircraft cooling system.

Referring now to FIG. 2, an exemplary embodiment of control system 200 for a cooling system of an electric vehicle is shown. In some embodiments, system 200 may include a controller 204. Controller 204 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Controller 204 may include a single computing device operating independently, or may include two or more computing device operating in concert, in parallel, sequentially or the like; two or more computing devices may be included together in a single computing device or in two or more computing devices. Controller 204 may interface or communicate with one or more additional devices as described below in further detail via a network interface device. Network interface device may be utilized for connecting controller 204 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. controller 204 may include but is not limited to, for example, a computing device or cluster of computing devices in a first location and a second computing device or cluster of computing devices in a second location. controller 204 may include one or more computing devices dedicated to data storage, security, distribution of traffic for load balancing, and the like. Controller 204 may distribute one or more computing tasks as described below across a plurality of computing devices of computing device, which may operate in parallel, in series, redundantly, or in any other manner used for distribution of tasks or memory between computing devices. Controller 204 may be implemented using a "shared nothing" architecture in which data is cached at the worker, in an embodiment, this may enable scalability of system 100 and/or computing device.

With continued reference to FIG. 2, controller 204 may be designed and/or configured to perform any method, method step, or sequence of method steps in any embodiment described in this disclosure, in any order and with any degree of repetition. For instance, controller 204 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. controller 204 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 2, controller 204 is communicatively connected to rotation mechanism 124. Controller 204 may be communicatively connected to a locking mechanism 208. Controller 204 may be communicatively connected to an opening mechanism 212. As used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure. Controller 204 may be configured to send an extension signal to rotation mechanism 124. The extension signal may cause rotation mechanism 124 rotate reel 120 in a forward direction. Controller 204 is also configured to send a retraction signal to rotation mechanism 124. The retraction signal causes rotation mechanism 124 to rotate reel 120 in a reverse direction. Forward direction and reverse direction may be consistent with any forward direction and reverse direction, respectively, disclosed as part of this disclosure. In some embodiments, controller 204 may be further configured to send a locking signal to the locking mechanism 208, wherein the locking signal causes the locking mechanism to enter its engaged state. In some embodiments, controller 204 may be further configured to controller to send an unlocking signal to locking mechanism 208.

With continued reference to FIG. 2, system 200 may further include a reel toggle 140. Reel toggle 140 may be communicatively connected to controller 204. Reel toggle 140 may be configured to send a first toggle signal to controller 204. The first toggle signal may cause controller 204 to send the retraction signal. In some embodiments, reel toggle 140 may be configured to send a first toggle signal to controller 204 for as long as reel toggle 140 is pressed or otherwise engaged. Furthermore, controller 204 may be configured to send the retraction signal to rotation mechanism 124 so long as controller 204 is receiving the first toggle signal. In this way, a user may control when rotation mechanism 124 retracts cooling cable 108 be engaging and disengaging reel toggle 140. In other embodiments, engaging reel toggle once, for any amount of time, may be sufficient to fully stow cooling cable 108. In some embodiments, reel toggle 140 may be configured to send a second toggle signal to controller 204. Second toggle signal may cause controller 204 to send an extension signal. Extension signal may be sent by controller 204 to rotation mechanism 124. In some embodiments, reel toggle 140 may be configured to send a second toggle signal to controller 204 for as long as reel toggle 140 is pressed or otherwise engaged. Furthermore, controller 204 may be configured to send the extension signal to rotation mechanism 124 so long as controller 204 is receiving the second toggle signal. In this way, a user may control when rotation mechanism 124 extends cooling cable 108 be engaging and disengaging reel toggle 140. In some embodiments, pushing or otherwise engaging reel toggle 140 may cause reel toggle 140 to send either first reel toggle signal or second toggle signal, depending on the last signal that was send by reel toggle 140. As a non-limiting example, if reel toggle 140 is pressed or otherwise engaged a first time, it may send a first toggle signal and if reel toggle 140 is pressed or otherwise engaged a second time, reel toggle 140 may send a second toggle signal. In some embodiments, if reel toggle 140 is pushed or otherwise engaged a third time, reel toggle 140 may send the first toggle signal.

With continued reference to FIG. 2, system 200 may further include a reel locking toggle 144. Reel locking toggle 144 may be communicatively connected to controller 204. Reel locking toggle 144 may be configured to send a reel locking toggle signal to controller 204. The reel locking toggle signal may cause controller 204 to send the unlocking signal.

With continued reference to FIG. 2, controller 204 may include a machine-learning model 216. Machine-learning module 216 may be used to control rotation mechanism 124 based on various cooling parameters. In an embodiment, rotation mechanism 124 may rotate in a forward or reverse direction based on whether cooling cable 108 is retracted or extended. Machine-learning model 216 may be used determine a position of rotation mechanism 124 to rotate to. Machine-learning model 216 may also be used to determine a speed, acceleration, or the like of rotation mechanism 124. Machine-learning model 216 may be trained with training data correlating cooling parameters to cooling cable positions, cooling parameters to rotational speeds of reel 120, and the like. Training data may include testing data from experimentation of rotational speeds, cooling cable positions, and the like. Cooling parameters may include time of day, proximity of electric vehicle to cooling cable, idle time, and the like. Machine-learning model 216 may be used to activate rotation mechanism 124 without user intervention, wherein a user may be a pilot, technician, or the like. Training data may include previous inputs and outputs from machine-learning model 216, such that machine-learning model 216 is iterative. Machine-learning model 216 may be consistent with any machine-learning model as discussed herein. Machine-learning model 216 may be generated using a machine-learning module as discussed with reference to FIG. 6.

Figure 3B:
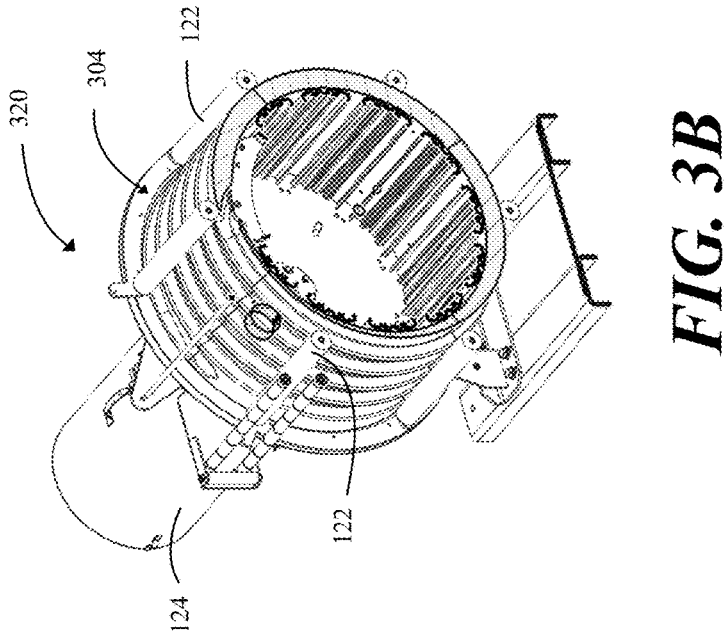
FIGS. 3A and B are diagrams of an exemplary embodiments of a cable reel.
Figure 3A:
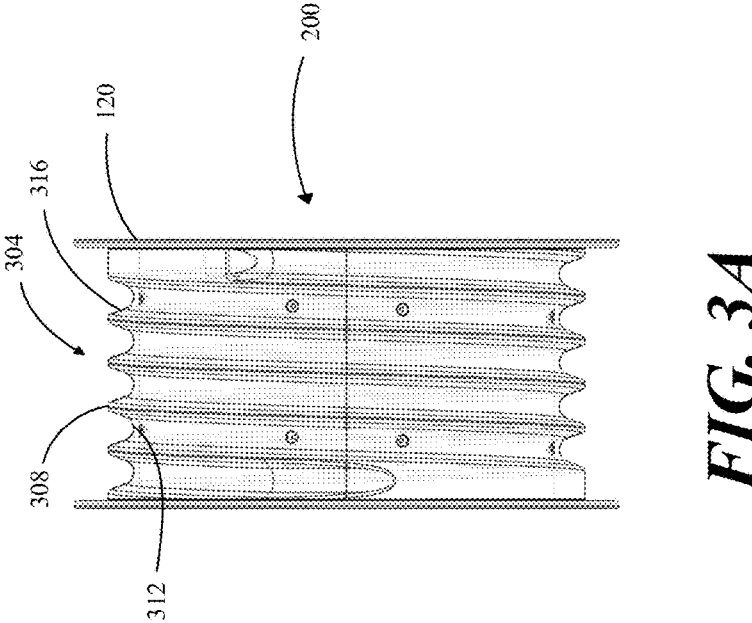

Referring now to FIG. 3A, an exemplary embodiment 300 of a cable reel 120. In an embodiment, a surface of reel 120 may have ridges in a helical pattern 304. Helical pattern 304 may be screw-like, such that there may be threads on reel 120. As used herein, a "thread" is a ridge of uniform section in the form of a helix. A thread may have characteristics, such as a crest 308, a root 312, a thread pitch, flank angle 316, and the like, much like a thread of a screw. A "crest" is the top part of a ridge of a thread. A "root" is the valley of a ridge of a thread. A "thread pitch" is a distance between threads, such as a distance between root to root. A "flank angle" is the angle of the side connecting the crest and the root. Cooling cable 108 may rest in between crests 308 in helical pattern 304, such as in a root 312 of helical pattern 304. Flank angle 316 may be configured to assist in coiling around helical pattern 304. For example, flank angle 316 may be curved to match the profile of cooling cable 108. Cooling cable 108 may be wrapped around reel 120 such that no part of the cooling cable 108 is touching other parts of the cooling cable 108. In other words, cooling cable 108 may be wrapped in a single layer of coils around reel 120 in helical pattern 304. Because of this, length of total threads in helical pattern 304 may be greater than or equal to length of cooling cable 108. In an embodiment, total thread length may be calculated as a length of cooling cable 108 per one coil of helical pattern 304. This number may then be multiplied by the total number of coils needed to coil the cooling cable 108 around reel 120. Length of reel 120 may be calculated as a function of the total thread length. The number of coils needed on helical pattern 304 may be calculated as a function of the diameter of reel 120 and length of cooling cable 108. A pitch of helical pattern 304 may be no less than a diameter of cooling cable 108. In an embodiment, a pitch of helical pattern 304 may be greater than the diameter of cooling cable 108. For example, the length of crest 308 may be ½" while the diameter of cooling cable 108 may be ⅝". In this example, the pitch of helical pattern 304 is 1⅛", which is greater than ⅝".

Continuing to reference FIG. 3A, helical pattern 304 dimensions may be determined as a function of heat distribution. Helical pattern 304 may be advantageous for cooling of the cooling cable 108. Because cooling cable 108 does not lie on top of itself when stowed, due to helical pattern 304, cooling cable 108 may not heat itself up due to conduction and/or convection. Each coil of cooling cable 108 may be resting between crests 308 of helical pattern 304. This may assist in heat dissipation as the coils are not touching each other. Pitch of helical pattern 304 and crest 308 length may be selected based on desired heat distribution to ensure adequate cooling of cooling cable 108. Additionally, height of crest 308, which is the vertical distance between the root 312 and the crest 308, may be raised to assist with heat dissipation. The height of crest 308 may be taller than the diameter of cooling cable 108. In an embodiment, the crest 308 may act as cooling fins, much like fins in a heat sink, to dissipate heat from the cooling cable 108. In an embodiment, crest 308 may be a length greater than the diameter of the cooling cable 108. This may act as cooling fins, as a greater length means more surface area for heat to dissipate from. For example, heat may dissipate from the cooling cable 108 to the reel 120 by way of conduction. Then, heat may dissipate from the reel 120 from the crest 308 (which acts as cooling fins) by way of convection. The cross-sectional shape from the crest 308 to the root may be triangular, rectangular, or the like. The cross-sectional shape may include curved edges and the like. In some embodiments, the portion of crest 308 that rises above cooling cable 108 may be fin shaped. Additionally, reel 120 may be composed of a material with a high thermal conductivity coefficient, such as a material with a thermal conductivity greater than 230 W/mK at 20° C. and 1 bar. For example, reel 120 may be composed of aluminum, copper, or the like. A high thermal conductivity for reel 120 may be important, as it may allow for greater heat transfer from cooling cable 108 to reel 120, which would allow for greater heat dissipation, and greater cooling. Cable reel 120 may transfer heat from the cooling cable 108 to an external environment, such as the ambient environment. This may be done using conduction to remove heat from the cooling cable 108 and convection to remove heat from the helical pattern 304 of the cable reel 120.

Now referring to FIG. 3B, an exemplary embodiment of an isometric view 320 of a cable reel. Isometric view 320 may show a plurality of idler drums 122 parallel to the cable reel 120. Cable reel 120 may be mechanically connected to a rotation mechanism 124. In an embodiment, cable reel 120 may be mechanically connected to an electric motor. As used herein, "mechanically connected" refers to one or more components that are connected, directly or indirectly, by mechanical fasteners. Mechanical fasteners may include bolts, rivets, screws, or the like. Cable reel 120 includes a helical pattern 304, wherein the cable connector may reside.

Figure 4:
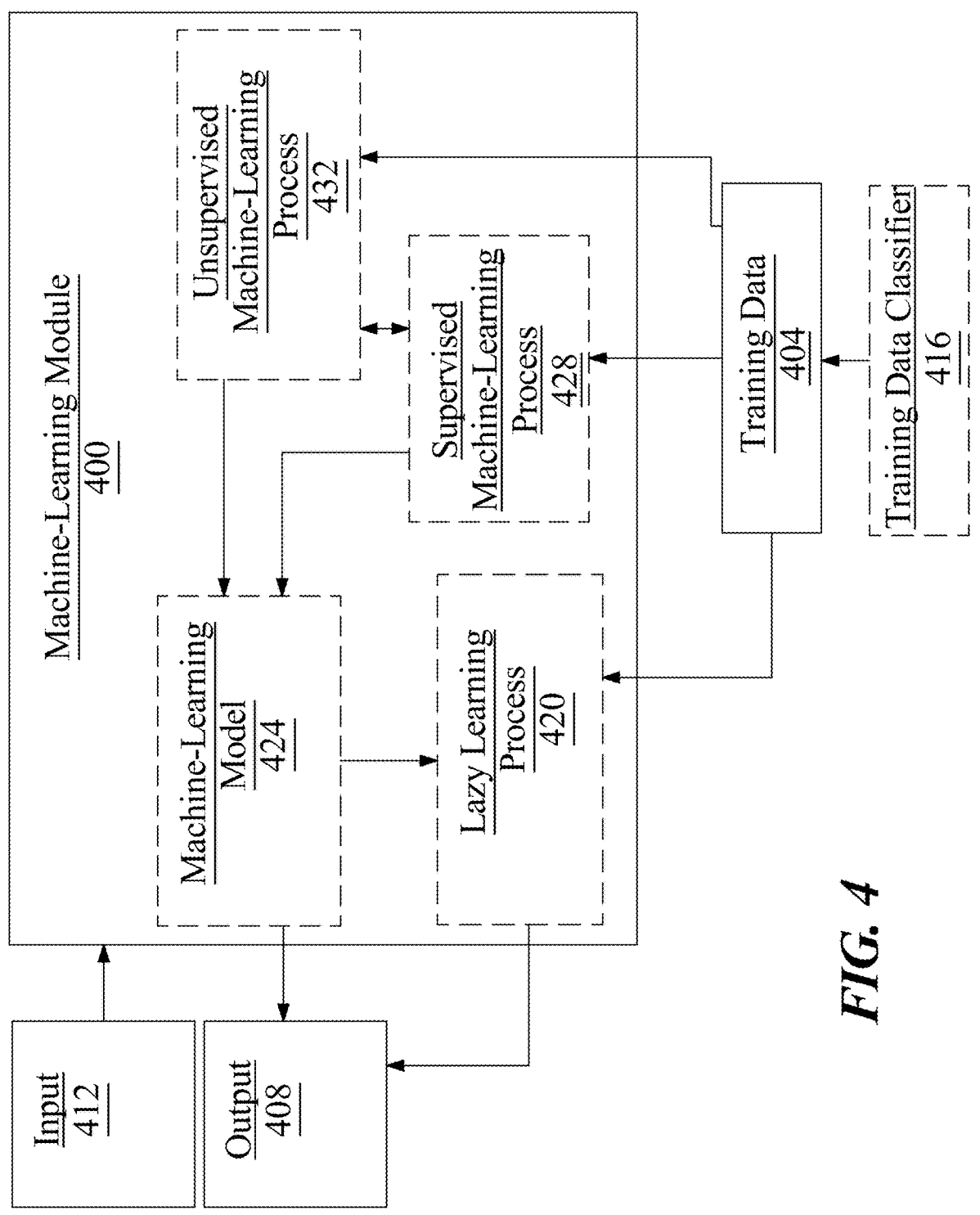
FIG. 4 is a block diagram of an exemplary machine learning model.

Referring now to FIG. 4, an exemplary embodiment of a machine-learning module 400 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 404 to generate an algorithm that will be performed by a computing device/module to produce outputs 408 given data provided as inputs 412; this is in contrast to a non-machine learning software program where the commands to be executed are determined in advance by a user and written in a programming language.

Still referring to FIG. 4, "training data," as used herein, is data containing correlations that a machine-learning process may use to model relationships between two or more categories of data elements. For instance, and without limitation, training data 404 may include a plurality of data entries, each entry representing a set of data elements that were recorded, received, and/or generated together; data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 400 may correlate any input data as described in this disclosure to any output data as described in this disclosure. As a non-limiting illustrative example flight elements and/or pilot signals may be inputs, wherein an output may be an autonomous function.

Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 400 may generate a classifier using a classification algorithm, defined as a processes whereby a computing device and/or any module and/or component operating thereon derives a classifier from training data 404. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to sub-categories of flight elements such as torques, forces, thrusts, directions, and the like thereof.

Still referring to FIG. 4, machine-learning module 400 may be configured to perform a lazy-learning process 420 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 4, machine-learning processes as described in this disclosure may be used to generate machine-learning models 424. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, machine-learning algorithms may include at least a supervised machine-learning process 428.

At least a supervised machine-learning process 428, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include flight elements and/or pilot signals as described above as inputs, autonomous functions as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

Further referring to FIG. 4, machine learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 5:
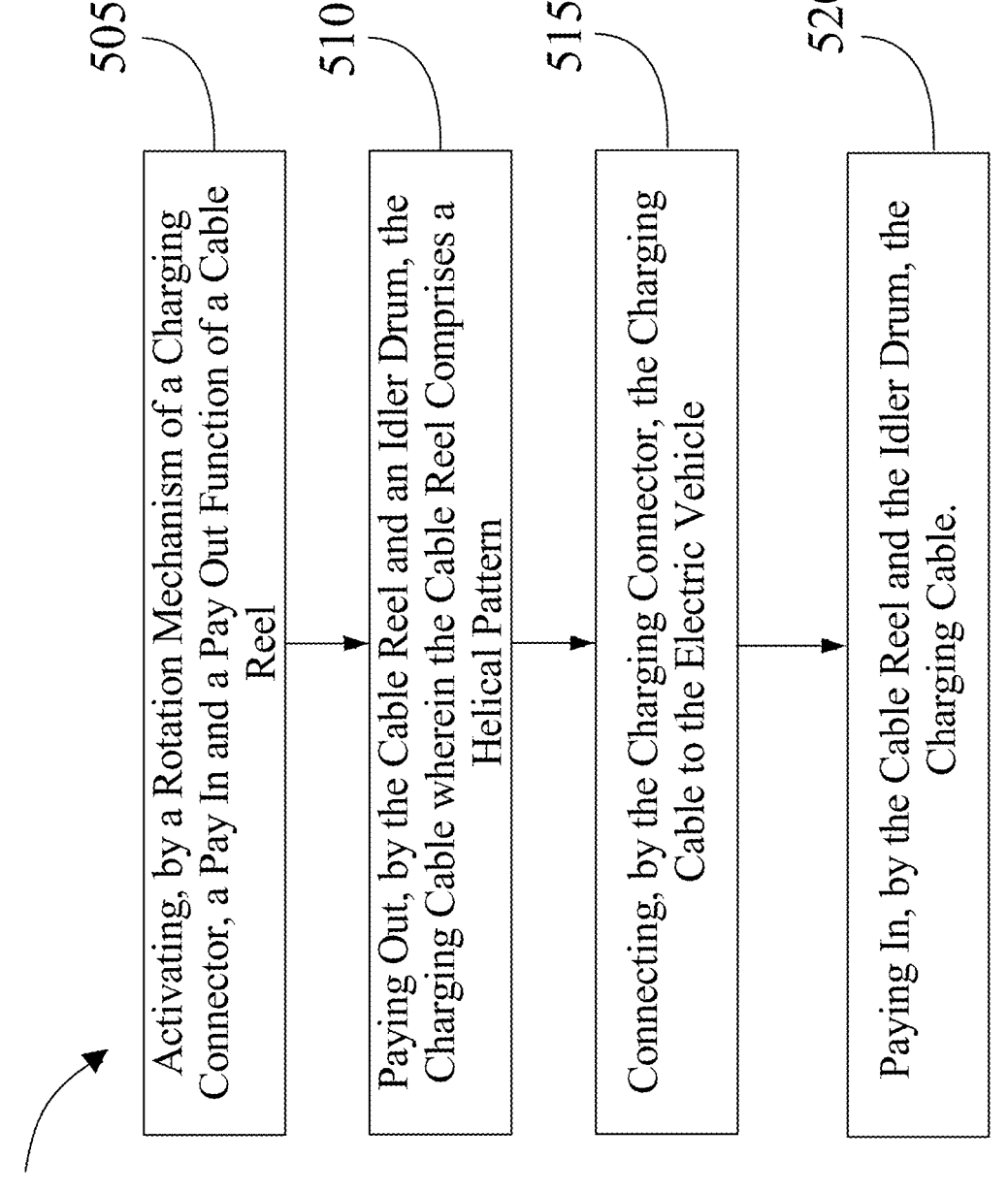
FIG. 5 is a method of use for a system of pay-in and pay-out function of a cooling system with a reel toggle for an electric vehicle.

Now referencing FIG. 5, a method 500 of use for an electric vehicle cooling system with a reel button for an electric vehicle is shown. Step 505 of method 500 includes activating, by an actuator of a cooling connector, a rotation mechanism of a cable reel. Actuator may be mounted to a surface of a cooling connector. The rotation mechanism may include an electric motor configured to rotate the cable reel. The rotation mechanism may pay in and pay out a cooling cable. This step may be implemented without limitation as described in FIGS. 1-4.

With continued reference to FIG. 5, step 510 of method 500 includes paying out, by a cable reel and an idler drum, a cooling cable, wherein the cable reel includes a helical pattern. The helical pattern may include a helical thread length greater than or equal to the length of the cooling cable. The helical pattern may include a pitch no less than a diameter of the cooling cable. The cooling cable may be configured to rest in a root between each helical thread. The idler drum may be configured to produce a resultant force during the pay out, thereby pushing the cooling cable away from the cable reel. This step may be implemented without limitation as described in FIGS. 1-4.

With continued reference to FIG. 5, method 500 may further include transferring heat, by a cable reel from a cooling cable to an external environment. This may be due to a helical pattern on the cable reel. This step may be implemented without limitation as described in FIGS. 1-4.

With continued reference to FIG. 5, method 500 includes a sp 515 of connecting, by the charging connector, the charging cable to the electric vehicle. This step may be implemented without limitation as described in FIGS. 1-4.

With continued reference to FIG. 5, method 500 includes step 520 of paying in, by a cable reel and an idler drum, a charging cable. This step may be implemented without limitation as described in FIGS. 1-4.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 6:
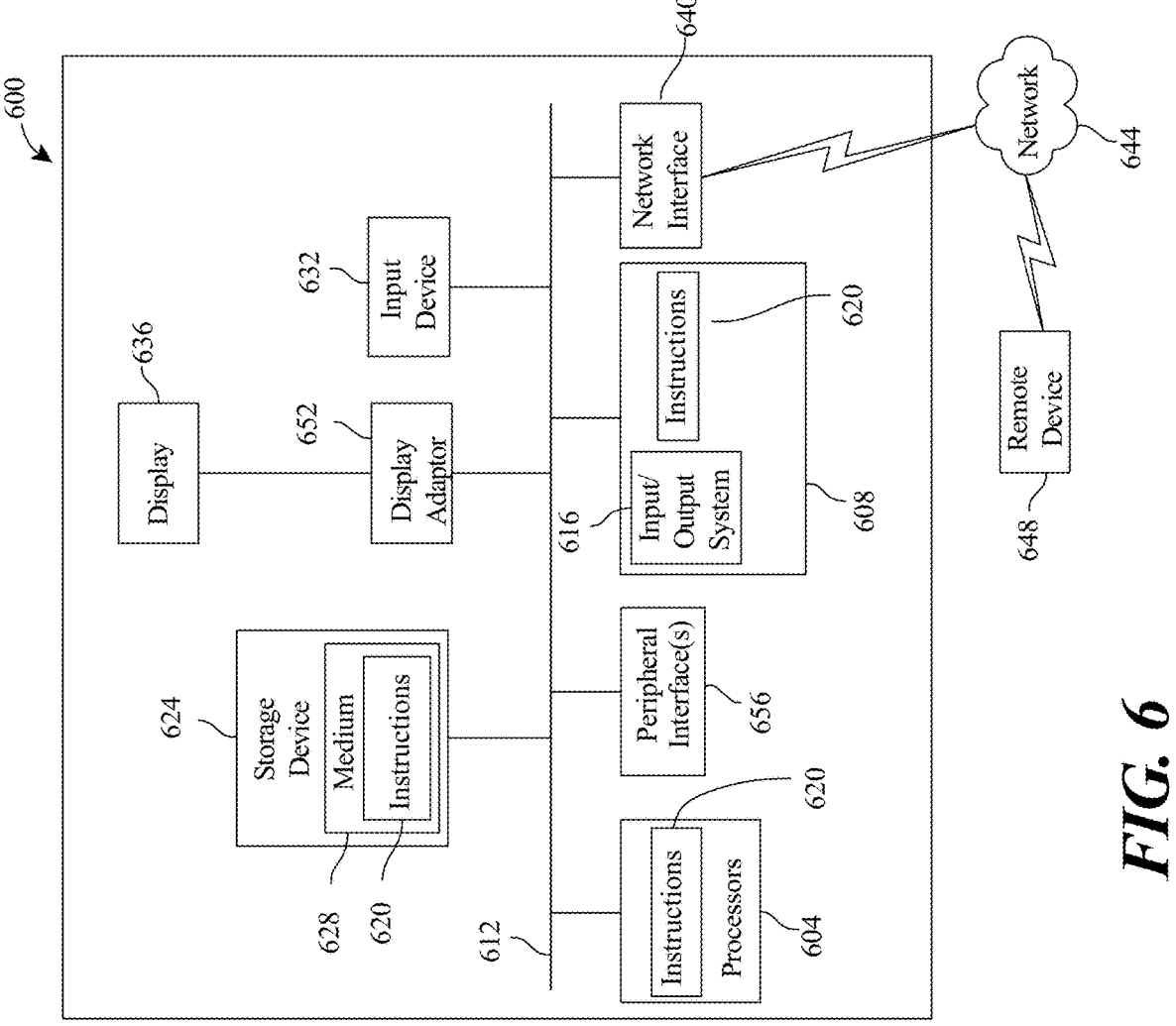
FIG. 6 is a block diagram of a computing system that can be used to implement any one or more of the methodologies disclosed herein and any one or more portions thereof.

FIG. 6 shows a diagrammatic representation of one embodiment of a computing device in the exemplary form of a computer system 600 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Processor 604 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 604 may be organized according to Von Neumann and/or Harvard architecture as a non-limiting example. Processor 604 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 608 may include various components (e.g., machine-readable media) including, but not limited to, a random-access memory component, a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within processor 604.

Computer system 600 may also include an input device 632. In one example, a user of computer system 600 may enter commands and/or other information into computer system 600 via input device 632. Examples of an input device 632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIRE-WIRE interface, a direct interface to bus 612, and any combinations thereof. Input device 632 may include a touch screen interface that may be a part of or separate from display 636, discussed further below. Input device 632 may be utilized as a user selection device for selecting one or more graphical representations in a graphical interface as described above.

A user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve systems according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A cooling system of an electric vehicle, the system comprising:
   a cooling cable;
   a cooling connector mechanically connected to the cooling cable, wherein the cooling connector comprises:
      a rotation mechanism configured to control a pay-in function and a pay-out function of the electric vehicle cooling system;
      a cable reel comprising a helical pattern and configured to stow the cooling cable; and
      an idler drum parallel to the cable reel, wherein the idler drum and the cable reel are configured to produce a resultant force during the pay-out function, thereby pushing the cooling cable away from the cable reel.

2. The system of claim 1, wherein the rotation mechanism comprises an electric motor mechanically connected to the cable reel and configured to rotate the cable reel.

3. The system of claim 1, wherein the helical pattern comprises a helical thread length greater than or equal to the length of the cooling cable.

4. The system of claim 1, wherein the helical pattern comprises a pitch no less than a diameter of the cooling cable.

5. The system of claim 1, wherein:
   the helical pattern comprises a plurality of helical threads; and
   the cooling cable is configured to rest in a root between each helical thread of the plurality of helical threads.

6. The system of claim 1, wherein the helical pattern comprises a crest configured to act as a cooling fin.

7. The system of claim 1, further comprising a coolant base comprising a coolant source, wherein the coolant source is fluidly connected to the cooling cable.

8. The system of claim 1, wherein the idler drum and the cable reel are further configured to produce a resultant force during:
   the pay-in function, thereby pulling the cooling cable to the cable reel.

9. The system of claim 1, wherein the cooling connector is incorporated within a charging connector.

10. The system of claim 1, further comprising a button mounted to a surface of the cooling connector, wherein the button is configured to control the rotation mechanism.

11. A method of use for a cooling system of an electric vehicle, the method comprising:
   activating, by a rotation mechanism of the cooling system, a pay-in and a pay-out function of a cable reel;
   paying out, by the cable reel and an idler drum, the cooling cable wherein the cable reel comprises a helical pattern;
   connecting, by the cooling connector, the cooling cable to the electric vehicle; and

US 12,673,571 B2

27

28 paying in, by the cable reel and the idler drum, the cooling cable, wherein the idler drum is configured to produce a resultant force during the paying out, thereby pushing the cooling cable away from the cable reel.

12. The method of claim 11, wherein the rotation mechanism comprises an electric motor mechanically connected to the cable reel and configured to rotate the cable reel.

13. The method of claim 11, wherein the helical pattern comprises a helical thread length greater than or equal to the length of the cooling cable.

14. The method of claim 11, wherein the helical pattern comprises a pitch no less than a diameter of the cooling cable.

15. The method of claim 11, wherein the cooling cable is configured to rest in a root between each helical thread.

16. The method of claim 11, wherein the helical pattern comprises a crest configured to act as a cooling fin.

17. The method of claim 11, further comprising providing, by a charger base, a coolant source fluidly connected to the cooling cable.

18. The method of claim 11, wherein the idler drum is further configured to produce a resultant force during:

the pay in, thereby pulling the cable to the cable reel.

19. The method of claim 11, wherein the cooling connector is incorporated with a charging connector.

20. The method of claim 11, further comprising controlling, by a button mounted to a surface of the cooling connector, the rotation mechanism.

\* \* \* \* \*